United States Patent [19]

Chan et al.

[11] Patent Number: 4,767,084
[45] Date of Patent: Aug. 30, 1988

[54] AUTONOMOUS STATIONKEEPING FOR THREE-AXIS STABILIZED SPACECRAFT

[75] Inventors: Fred N. Chan, Atherton; Wallace E. Reimche, Saratoga, both of Calif.

[73] Assignee: Ford Aerospace & Communications Corporation, Detroit, Mich.

[21] Appl. No.: 908,757

[22] Filed: Sep. 18, 1986

[51] Int. Cl.$^4$ ............................................... B64G 1/24
[52] U.S. Cl. ..................... 244/164; 244/165; 244/169; 244/171
[58] Field of Search ................ 244/164, 165, 169, 171

[56] References Cited

U.S. PATENT DOCUMENTS

| | | |
|---|---|---|
| 3,511,452 | 5/1970 | Smith et al. ................ 244/165 |
| 3,591,108 | 7/1971 | Perkel et al. . |
| 3,940,096 | 2/1976 | Keigler et al. . |
| 3,998,409 | 12/1976 | Pistiner . |
| 4,010,921 | 3/1977 | Pistiner et al. . |
| 4,071,211 | 1/1978 | Muhlfelder et al. . |
| 4,084,772 | 4/1978 | Muhlfelder . |
| 4,161,780 | 7/1979 | Rudolph et al. . |
| 4,275,861 | 6/1981 | Hubert . |
| 4,288,051 | 9/1981 | Goschel . |
| 4,294,420 | 10/1981 | Broquet . |

FOREIGN PATENT DOCUMENTS 27199  3/1977  Japan ........................... 244/165

Primary Examiner—Joseph F. Peters, Jr.
Assistant Examiner—Rodney Corl
Attorney, Agent, or Firm—Edward J. Radlo; Keith L. Zerschling

[57] ABSTRACT

Apparatus for autonomously performing stationkeeping maneuvers for three-axis stabilized spacecraft (1) such as geosynchronous satellites. For each of one or more spacecraft axes (y, z) the invention autonomously performs desaturation of a momentum/reaction wheel (31-32, 41, respectively) associated with that axis, while simultaneously accomplishing the preselected compensation of the spacecraft's east-west position. Thrusters (35-38, 45-48) having a polarity corresponding to the desired desaturation polarity are fired in a particular sequence: when a preselected east-west firing bias is present, the thrusters fired are solely from that face of the spacecraft (1) needed to counteract the east-west deviation. After the bias has been worked down, thrusters are fired from alternating spacecraft faces. An open loop portion (63-74) of the instant circuit performs or completes working-down of the east-west firing bias once per preselected firing period in those cases where the desaturation maneuvers are not sufficient to perform this function by themselves.

8 Claims, 2 Drawing Sheets

AUTONOMOUS STATIONKEEPING FOR THREE-AXIS STABILIZED SPACECRAFT

TECHNICAL FIELD

This invention pertains to the field of maintaining the east-west (E-W) positioning of a 3-axis stabilized spacecraft while simultaneously providing for the desaturation of on-board momentum/reaction wheels.

BACKGROUND ART

U.S. Pat. No. 3,591,108 describes an apparatus to control satellite wobble, precession, and nutation, using a momentum/reaction wheel.

U.S. Pat. No. 3,940,096 describes a method to reorient a satellite's spin axis relative to its momentum wheel axis.

U.S. Pat. No. 3,998,409 describes an apparatus to minimize satellite attitude error resulting from static coulomb friction and cogging torques of wheel speed reversal.

U.S. Pat. No. 4,010,921 describes an apparatus to desaturate (unload) spacecraft momentum/reaction wheels using magnetic torquers. The E-W deviations addressed by the present invention cannot be compensated by magnetic torquers.

U.S. Pat. No. 4,071,211 describes an apparatus to provide a momentum biased 3-axis satellite attitude control system using three or more momentum wheels.

U.S. Pat. No. 4,084,772 describes an apparatus to generate a nodding function to control spacecraft roll and yaw pointing.

U.S. Pat. No. 4,161,780 describes an apparatus to determine the orientation of and to precess a spinning spacecraft using on-board processing.

U.S. Pat. No. 4,275,861 describes an apparatus to reorient a momentum stabilized spacecraft.

U.S. Pat. No. 4,288,051 describes a method to control a 3-axis stabilized satellite from transfer orbit to synchronous orbit using a bipropellant.

U.S. Pat. No. 4,294,420 describes a method to control a satellite's attitude using two canted momentum wheels.

DISCLOSURE OF INVENTION

The present invention finds utility in controlling a spacecraft (1) that is three-axis stabilized. In such a spacecraft, there is at least one momentum/reaction wheel (31-32, 41) mounted on board the spacecraft (1) for maintaining the spacecraft's attitude with respect to an axis (y, z, respectively). A set of thrusters (35-38, 45-48) is mounted about the periphery of the spacecraft (1) for desaturating the momentum/reaction wheel (31-32, 41, respectively) and for performing change in velocity maneuvers. Means (5) coupled to the momentum/reaction wheel (31-32, 41) determine when the momentum/reaction wheel (31-32, 41) reaches saturation. Coupled to the determining means (5) are means (13-19, 21, 50-74) for performing any desired desaturation of the momentum/reaction wheel (31-32, 41) while simultaneously accomplishing a preselected compensation of the spacecraft's east-west orbital position.

Advantages of the present invention include:

1. All manual east-west stationkeeping maneuvers are eliminated.

2. Yaw error caused by transitioning from spacecraft stationkeeping maneuvers to wheel control mode are eliminated. These errors are caused by digital-integrating-rate-assembly (DIRA) gyro drift, the fact that there is a pointing deadband, and residual roll rate (which gets converted into yaw attitude in a momentum biased system) as a result of firing thrusters during stationkeeping.

3. The amount of time needed for stationkeeping is reduced, increasing the time available for the satellite's normal operations.

4. Propellent usage is optimized.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
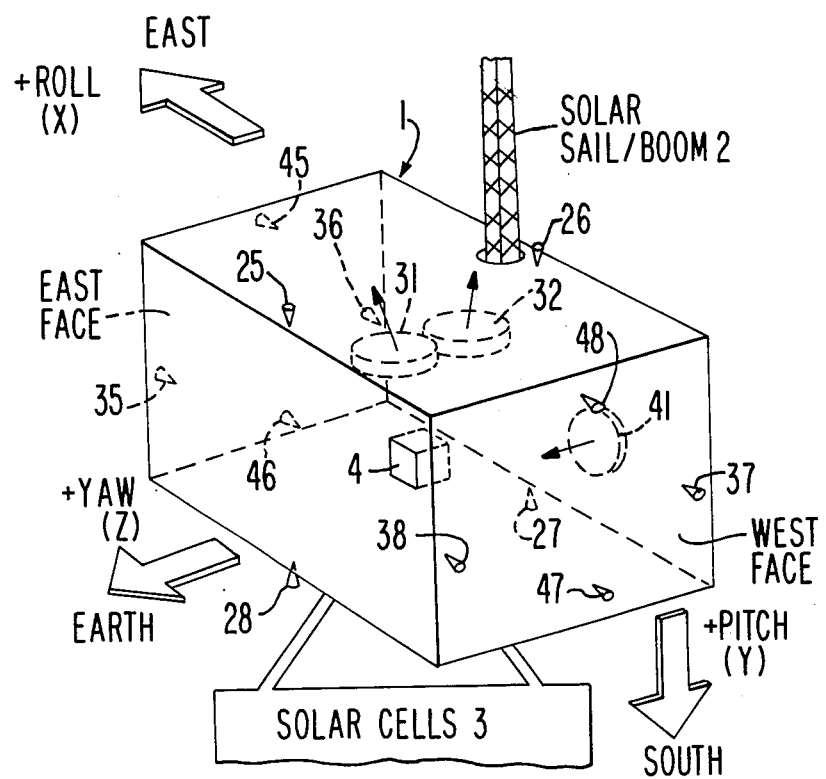
FIG. 1 is an isometric view showing the orientation of axes, thrusters, and momentum/reaction wheels in a 3-axis controlled satellite which can advantageously utilize the present invention.

FIG. 1 illustrates a typical three-axis stabilized spacecraft 1 which can advantageously use the present invention. The spacecraft 1 is a satellite positioned in geosynchronous orbit above the earth's equator. Periodic east-west velocity corrections must be imparted to the satellite 1 in order to compensate for east-west drift and thus keep the satellite 1 in its desired orbital position. The east-west compensations are part of a set of procedures often referred to as stationkeeping maneuvers.

The east-west drift is caused by two factors: (1) Orbital drift due to orbital kinematics. This factor is predictable from the satellite's orbital slot (angular position) and is the subject of the bias fed to register 6 (see FIG. 2); and (2) If the satellite 1 is not perfectly solar pressure balanced about its center of mass, solar torque will eventually force the momentum/reaction wheels 31-32, 41 into saturation. The momentum/reaction wheels 31-32, 41 then must be desaturated in order to render them useful in performing attitude control. The desaturation procedures entail the firing of thrusters 35-38, 45-48 to add or subtract angular momentum (by increasing or decreasing wheel speed) to the wheels 31-32, 41, respectively (and thus along the axes y, z, respectively, corresponding thereto). It is this thruster firing which causes an east-west deviation.

For a conventional satellite 1, factor number 2, above, is more significant than factor number 1. The present invention automatically compensates for both types of east-west drift, while simultaneously allowing for desaturation of the wheels 31-32, 41 in the proper direction.

Labeled on FIG. 1 are the three orthogonal spacecraft axes: plus roll (x), plus pitch (y), and plus yaw (z). In the satellite 1 illustrated in FIG. 1, a pair of pitch momentum/reaction wheels 31-32 are positioned in the yz plane, each canted slightly in yaw. A third momentum/reaction wheel 41 is aligned along but offset from the yaw axis. Wheel 41 has its angular momentum vector parallel to the yaw axis; thus, wheel 41 is known as the yaw momentum/reaction wheel. The pitch component of angular momentum of the pitch momentum/reaction wheels 31-32 controls the satellite's attitude about the pitch axis. The yaw momentum/reaction wheel 41 and the yaw component of angular momentum of the pitch momentum/reaction wheels 31–32 control the instantaneous roll attitude and stability of the satellite 1. The yaw attitude is controlled through quarter-orbit roll-yaw dynamic coupling in a momentum biased system.

A panel of solar cells 3 provides electrical power for the satellite 1. A solar sail/boom 2 is positioned on a face of the satellite 1 opposite that of the solar array 3 to balance the solar pressure impinging on said cells 3. Attitude and orbit control electronics (AOCE) 4 receives signals from the earth and controls many aspects of the satellite's operation, including the present invention.

The illustrated satellite 1 is shown as having 12 thrusters situated about its periphery: six thrusters for providing positive and negative torque about each of the three axes x, y, z; and six back-up thrusters. There are four roll thrusters 25–28, four pitch thrusters 35–38, and four yaw thrusters 45–48. The polarities of the thrusters follow the right hand rule with respect to adding or subtracting momentum about the corresponding axis; thus, thrusters labeled with even numbers are considered to be positive thrusters, because firing said thrusters causes the addition of angular momentum along the positive direction of the corresponding axis. Thrusters labeled with odd numbers are considered to be negative thrusters, because firing said thrusters causes the subtraction of angular momentum with respect to the positive direction of the corresponding axis.

Figure 2:
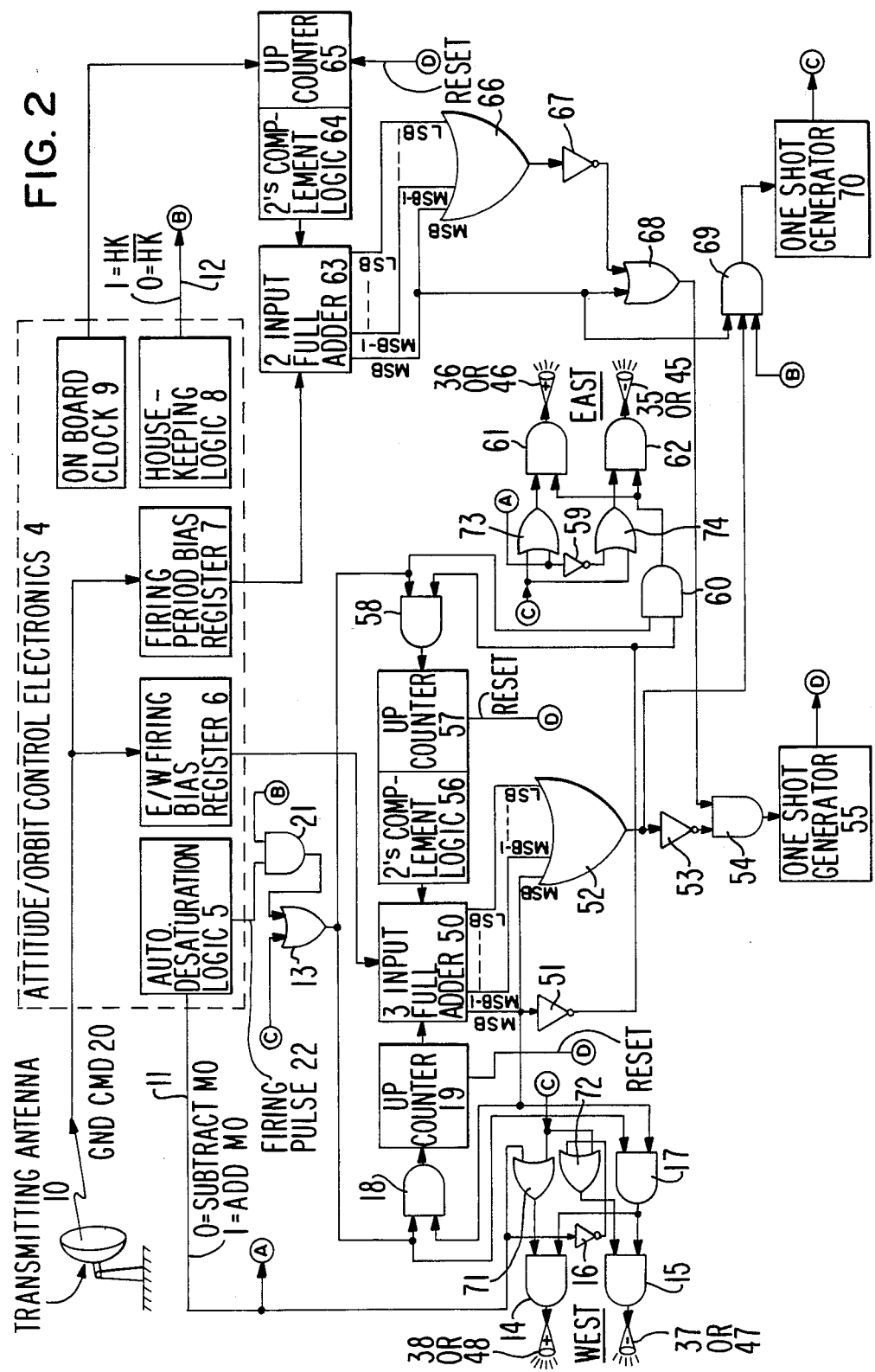
FIG. 2 is a circuit diagram of a preferred embodiment of the present invention.

On-board the satellite 1 are two sets of logic of the type illustrated in FIG. 2: a first set for the pitch axis and a second set for the yaw axis. Thus, the four thrusters illustrated in FIG. 2 are labeled with alternative numerical designations, indicating that the circuit can be used for the pitch axis (thrusters 35–38), or the yaw axis (thrusters 45–48).

A transmitting antenna 10 on the earth sends ground commands 20 to the satellite 1. Commands 20 are forwarded (via an unillustrated on-board antenna) to attitude and orbital control electronics (AOCE) 4. Commands 20 comprise an east-west (E/W) firing bias fed into register 6 and a firing period bias fed into register 7, within AOCE 4. The E/W firing bias is a binary integer designating the number of times a thruster must be fired over a preselected firing period in order to compensate for the east-west drift. This firing bias is based upon known disturbance torques for the particular orbital position of the satellite 1. A positive firing bias corresponds to the need to fire a thruster 35, 36, 45, 46 on the east face of satellite 1. A negative firing bias corresponds to the need to fire a thruster 37, 38, 47, 48 on the west face of satellite 1.

The firing period stored in register 7 must correspond to the firing bias stored in register 6. The firing period must be sufficiently large that the number within register 6 is an integer. Thus, if the orbital mechanics dictate that 15 thruster pulses must be fired every 30 days in order to compensate for the east-west drift, register 6 can contain a 15 and register 7 can contain a 30. Alternatively, register 6 can contain a 30 and register 7 can contain a 60. However, it would not be possible for register 6 to contain a 7.5 and register 7 a 15, because in that case the contents of register 6 would not be an integer.

Automatic desaturation logic 5, as is conventionally utilized on the satellites of today, produces two outputs: a firing pulse 22 issued whenever (typically once per day) a thruster must be fired in order to accomplish desaturation, and a polarity signal 11. In this case, signal 11 is a logical zero when momentum must be subtracted along the corresponding axis, and a logical one when momentum must be added. Signal 11 is fed to AND gate 14, to AND gate 15 via inverter 16, to AND gate 61, and to AND gate 62 via inverter 59. Thus, two positive thrusters (38 and 36 or 48 and 46) are conditionally enabled when signal 11 is a logical one, and two negative thrusters (37 and 35 or 47 and 45) are conditionally enabled when signal 11 is a logical zero. The condition spoken of here is one that will result in only one thruster being fired at any given time, as explained below.

The firing pulse 22 emanating from automatic desaturation logic 5 is ANDed at AND gate 21 with housekeeping signal 12, then fed to OR gate 13, which controls the thruster firing and the updating of counters 19 and 57 and adder 50. Housekeeping signal 12 emanating from housekeeping logic 8 is a logical 1 when the satellite 1 is in a housekeeping mode as opposed to an operational mode, and signal 12 is a logical 0 when the satellite 1 is in an operational and not a housekeeping mode. Thus, AND gate 21 insures that thruster firing will not be done during an operational mode (when the satellite's attitude may be critical), but rather during a housekeeping mode intended for such maneuvers.

The output of OR gate 13 is fed to AND gates 18, 58, 17, and 60. If and only if the most significant bit (MSB) emanating from three-input full adder 50 is a logical 1 (which happens when the contents of adder 50 are negative), AND gate 17 is enabled, causing a west thruster to fire, and AND gate 18 is enabled, causing the incrementing of up counter 19, which counts the number of west thrusters that have been fired. Similarly, and because of the action of inverter 51 operating on said MSB, when and only when said MSB is a 0, AND gate 60 is enabled, causing an east thruster to be fired, and AND gate 58 is enabled, causing the incrementing of up counter 57, which counts the number of firings of east thrusters.

The binary number within counter 57 is converted into a negative form by 2's complement logic 56 and fed as a first input to adder 50. The other two inputs to adder 50 come from counter 19 and from register 6. Thus, the number in adder 50 equals the number of times a west thruster has been fired, minus the number of times an east thruster has been fired, plus the number of times an east thruster has to be fired (or minus the number of times a west thruster has to be fired) in order to compensate for the east-west drift. By this technique, the E/W bias is worked down to 0 by means of repetitive firings on either the east or west face; then east and west thrusters alternate so as to maintain the satellite's east-west position. All of these thrusters have the proper polarity corresponding to the desired desaturation polarity as governed by signal 11.

The initial values in counters 19 and 57 are each 0. Let us assume that a plus 5 is present in register 6. Thus, the initial contents of adder 50 are plus 5. The MSB is thus 0 because, by definition, the MSB of a positive number or zero is zero. Thus, an east thruster gets fired. Up counter 57 gets incremented to become a 1. This causes the contents of adder 50 to become a 4. The MSB is still 0; thus, an east thruster gets fired again. Counter 57 now contains a 2 and adder 50 contains a 3. This loop continues until adder 50 contains a minus 1 (all the while assuming that firing pulses 22 continue to emanate from logic 5). When the contents of adder 50 become negative, the MSB becomes a one, and now a west thruster rather than an east thruster is fired, and counter 19 rather than counter 57 gets incremented. This brings the value in adder 50 back to 0. The resulting 0 MSB causes an east thruster to be fired, followed by a west thruster, etc., etc., until such time as the desaturation has been completed as evidenced by the exhaustion of the desaturation pulses 22.

The contents of adder 50 are fed as inputs to OR gate 52. When any one of these inputs is a logical one, the output of OR gate 52 is likewise a logical one, which means that either the E/W firing bias has not been worked down, or at least it is desired to switch the face for which a thruster will be fired. If the preselected firing period is long enough, at some point all the inputs to OR gate 52 will be logical 0's, in which case the output of OR gate 52 will also be a logical 0. This output is inverted by inverter 53, which will thus have a logical 1 output. This conditionally causes one-shot generator 55 to reset all three counters 19, 57, and 65, indicating that the desired thruster firing has been accomplished. The condition, which is introduced by AND gate 54, is that the firing period has expired. This condition is signaled via a logical 1 from the output of OR gate 68.

The remainder of the circuit is present so that the east-west compensation will be accomplished even when no momentum/reaction wheel 31–32, 41 desaturation is required, or when the amount of required desaturation is insufficient to work down the E/W firing bias stored in register 6.

An on-board clock 9 increments up counter 65. The contents of counter 65 are negativized by 2's complement logic 64 and fed as a first input to two-input full adder 63. The second input to adder 63 comes from register 7. Thus, adder 63 acts as a time comparator. After the firing period has been reached, the contents of adder 63 become negative, and thus the MSB within adder 63 becomes a 1. This MSB is fed as a first input to OR gate 68. Thus, when the MSB becomes a 1, the output of OR gate 68 likewise becomes a 1, conditionally enabling AND gate 54 as described previously.

The MSB of adder 63 is also fed as the first of three inputs to AND gate 69, meaning it is a necessary condition for the firing of one-shot generator 70, which triggers a pulse fed to OR gate 13, which controls the firing of thrusters as previously described. The second input to AND gate 69 is signal 12, which, as previously stated, is a logical 1 when and only when a housekeeping mode is in effect. The third input to AND gate 69 is the output of OR gate 52. To repeat, a logical 1 present at the output of OR gate 52 means that either the bias has not been worked down or at the very least it is desired to switch faces for which a thruster should be fired. By definition, this means that there is an east-west deviation. Thus, when all three of these conditions are present, one-shot generator 70 fires, causing the desired thruster firing.

The widths of the pulses emanating from generator 70 are one-half the widths of pulses 22. This is because in the open-loop firing triggered by generator 70, pairs of thrusters, rather than a single thruster, are fired in order to effectuate the desired east/west maneuver without imparting a torque to the satellite 1. This is accomplished by routing the output of generator 70 to the four thrusters via OR gates 71–74, respectively. Either the two west thrusters or the two east thrusters are fired (based upon the status of the MSB of adder 50, as described previously), regardless of the status of the desaturation signal 11. This is because the OR gates 71–74 force feed a logical one to the thruster-controlling AND gates 14, 15, 61, 62, respectively, bypassing the effect of inverters 16 and 59.

The output from generator 70 is also fed as the second input to OR gate 13 in order to update counters 19 and 57 and adder 50. This part of the circuit operates as previously described, until finally the E/W firing bias is worked down.

The contents of adder 63 are fed bit by bit as inputs to OR gate 66; thus, the output of OR gate 66 is a logical 1 whenever we are not exactly at the beginning or end of a firing period. In such an eventuality, the logical 1 is transformed to a logical 0 by inverter 67 and fed as the second input to OR gate 68. This disables AND gate 54, suppressing the resetting of the three counters (19, 57, 65) by one-shot generator 55 before the firing period has been completed.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. Apparatus for controlling a 3-axis stabilized spacecraft, comprising:
    at least one momentum/reaction wheel mounted on board the spacecraft for maintaining the spacecraft's attitude with respect to an axis;
    a set of thrusters mounted about the periphery of the spacecraft for desaturating the momentum/reaction wheel and for accomplishing change in velocity maneuvers;
    coupled to the momentum/reaction wheel, means for determining when the momentum/reaction wheel reaches saturation; and
    coupled to the determining means, means for performing any desired desaturation of the momentum/reaction wheel while automatically and simultaneously accomplishing a preselected compensation of the spacecraft's east-west position.

2. The apparatus of claim 1 wherein at least two thrusters, on opposing spacecraft faces, have a first polarity corresponding to a placement of the thruster in such a way as to add momentum along said axis, and at least two thrusters, on opposing spacecraft faces, have a second polarity corresponding to a placement of the thruster in such a way as to subtract momentum along said axis.

3. The apparatus of claim 2 wherein the determining means produces a signal having a value defining whether momentum has to be added or subtracted along said axis in order to desaturate said wheel; and
    the performing means, in response to said value, activates a thruster having a polarity that will accomplish the desired desaturation, and further, said thruster is on a spacecraft face that will achieve the desired east-west compensation.

4. The apparatus of claim 1 further comprising a commandable register on-board the spacecraft for storing a bias amount representing the expected east-west drift in the spacecraft's orbital position as a function of a preselected firing period of time.

5. The apparatus of claim 4 wherein the performing means, in response to the bias amount, initially fires thrusters on a face of the spacecraft that will compensate for the east-west drift while simultaneously desaturating the momentum/reaction wheel in the desired direction; and after the east-west drift has been compensated, the performing means fires thrusters on alternate faces of the spacecraft to maintain the spacecraft's east-west position while simultaneously accomplishing any residual required momentum/reaction wheel desaturation.

6. The apparatus of claim 1 further comprising means for compensating, once every preselected firing period of time, for east-west drift in the spacecraft's orbital position, regardless of whether any momentum/reaction wheel desaturation has been performed during the preceding firing period, said compensating means comprising:

on board the spacecraft, a register containing the preselected firing period of time;

a clock on board the spacecraft;

coupled to an output of the register and an output of the clock, an OR-gate having an output signaling when the preselected firing period of time has expired;

means for indicating when east-west correction is needed; and means for combining the output of the OR-gate with an output of the indicating means, said combining means having an output which triggers the firing of thrusters to accomplish any needed east-west correction.

7. The apparatus of claim 1 wherein the spacecraft is a satellite in geosynchronous orbit, and the momentum/reaction wheel has a component of angular momentum lying along the satellite's pitch axis.

8. The apparatus of claim 1 wherein the spacecraft is a satellite in geosynchronous orbit, and the momentum/reaction wheel has a component of angular momentum lying along the satellite's yaw axis.

* * * * *